US009262593B2

(12) United States Patent
Kay et al.

(10) Patent No.: US 9,262,593 B2
(45) Date of Patent: Feb. 16, 2016

(54) CLIENT SERVICES FOR WEB-BASED APPLICATIONS

(75) Inventors: Jeffrey Kay, Bellevue, WA (US); Rui Zhou, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 176 days.

(21) Appl. No.: 13/531,729

(22) Filed: Jun. 25, 2012

(65) Prior Publication Data

US 2013/0347126 A1    Dec. 26, 2013

(51) Int. Cl.

| G06F 21/30 | (2013.01) |
| G06F 21/12 | (2013.01) |
| G06F 21/31 | (2013.01) |
| G06F 21/00 | (2013.01) |
| G06Q 30/00 | (2012.01) |
| G06F 21/62 | (2013.01) |

(52) U.S. Cl.
CPC .............. *G06F 21/00* (2013.01); *G06F 21/121* (2013.01); *G06F 21/30* (2013.01); *G06F 21/6218* (2013.01); *G06Q 30/00* (2013.01)

(58) Field of Classification Search
CPC .............. G06Q 20/12; G06Q 30/0613; G06Q 30/0253; G06Q 30/00; H04L 67/02; G06F 21/121; G06F 21/128; G06F 21/30; G06F 21/305; G06F 21/31
USPC .......................................................... 709/229
See application file for complete search history.

(56) References Cited

U.S. PATENT DOCUMENTS

| 6,101,510 | A | 8/2000 | Stone et al. |
| 7,107,536 | B1 | 9/2006 | Dowling |
| 7,386,483 | B1 * | 6/2008 | Lee et al. ..................... 705/26.3 |
| 7,814,142 | B2 | 10/2010 | Mamou et al. |
| 7,849,067 | B2 | 12/2010 | Vaughan et al. |
| 7,856,478 | B2 * | 12/2010 | Jachner ....................... 709/206 |
| 7,860,971 | B2 | 12/2010 | Gao et al. |
| 7,941,546 | B2 | 5/2011 | Rice et al. |
| 7,984,113 | B2 | 7/2011 | Steinwagner |
| 8,190,703 | B2 | 5/2012 | Lin et al. |

(Continued)

OTHER PUBLICATIONS

Ladd, Seth, "Launching Your App in the Chrome Web Store", Retrieved at <<http://code.google.com/chrome/webstore/articles/launching.html>>, Oct. 24, 2010, pp. 5.

(Continued)

*Primary Examiner* — Tae Kim
(74) *Attorney, Agent, or Firm* — Judy Yee; Micky Minhas

(57) ABSTRACT

A system for acquiring access to a web-based application includes one or more computer-readable storage media and an application (e.g., a web browser) for accessing and retrieving over a network a plurality of resources. The system also includes a program interface embodied on the one or more computer-readable storage media. The program interface is configured to present a common set of application program interfaces (APIs) that can be used by the application to demonstrate that a user of the application is entitled to access a first resource. The system also includes programming logic configured to determine if the user of the application is authorized to access the first resource. If it is determined that authorization has not been established to access the first resource, the application is directed to communicate with a marketplace to obtain authorization to access the first resource.

19 Claims, 6 Drawing Sheets

(56) References Cited

U.S. PATENT DOCUMENTS

| | | | |
|---|---|---|---|
| 8,561,088 B2* | 10/2013 | Kim | G06F 9/465 717/162 |
| 9,032,303 B2* | 5/2015 | Hall | H04L 67/025 709/203 |
| 2002/0078212 A1* | 6/2002 | Besaw et al. | 709/228 |
| 2003/0079052 A1 | 4/2003 | Kushnirskiy | |
| 2004/0024815 A1 | 2/2004 | Kawase et al. | |
| 2005/0165656 A1* | 7/2005 | Frederick et al. | 705/26 |
| 2008/0071881 A1 | 3/2008 | Kronlund et al. | |
| 2008/0195628 A1 | 8/2008 | Kim et al. | |
| 2008/0249885 A1* | 10/2008 | Ting et al. | 705/26 |
| 2009/0055261 A1 | 2/2009 | Yeh et al. | |
| 2009/0144172 A1* | 6/2009 | Frederick et al. | 705/26 |
| 2009/0254837 A1* | 10/2009 | Dybdahl | H04L 67/02 715/749 |
| 2009/0307135 A1* | 12/2009 | Gupta et al. | 705/44 |
| 2010/0106565 A1* | 4/2010 | Manesh et al. | 705/10 |
| 2010/0281107 A1* | 11/2010 | Fallows et al. | 709/203 |
| 2011/0010759 A1 | 1/2011 | Adler | |
| 2011/0099068 A1 | 4/2011 | Takano et al. | |
| 2011/0225506 A1* | 9/2011 | Casalaina et al. | 715/741 |
| 2012/0042036 A1 | 2/2012 | Lau et al. | |
| 2012/0246555 A1* | 9/2012 | Masten | G06F 21/31 715/234 |
| 2012/0284767 A1* | 11/2012 | Hockings | H04L 63/20 726/1 |
| 2013/0227424 A1* | 8/2013 | Hall | H04L 67/025 715/740 |

OTHER PUBLICATIONS

Laberge, Paul, "Getting Paid on the Marketplace Just Got a Lot Easier", Retrieved at <<http://blogs.msdn.com/b/cdnmobiledevs/archive/2011/12/09/getting-paid-on-the-marketplace-just-got-a-lot-easier.aspx>>, Dec. 9, 2011, pp. 2.

Mahemoff, Michael, "HTML5 vs Native: The Mobile App Debate", Retrieved at <<http://www.html5rocks.com/en/mobile/nativedebate/>>, Jun. 3, 2011, pp. 11.

Carraro, et al., "Efficient Software Delivery through Service Delivery Platforms ", Retrieved at <<http://milessteve.web.officelive.com/Documents/Opsource_EfficientServiceDelivery.pdf>>, Mar. 1, 2012, p. 7-13.

* cited by examiner

CLIENT SERVICES FOR WEB-BASED APPLICATIONS

BACKGROUND

Web-based applications are becoming more and more common. One type of web-based application is applications that reside on a server and which are accessed as a service using a web-browser executed on a client device. Such web-based applications are sometimes referred to as hosted web applications. Another type of web-based applications is applications that are downloaded and installed into the web-browser on the client device. Such web-based applications are sometimes referred to as packaged applications.

The line between conventional applications and web-based applications is beginning to blur significantly, particularly with the deployment of HTML5. Using HTML5 and an appropriate browser, a developer can deliver to a user full-fidelity applications with services that previously were only available from installed applications (i.e., locally stored data and application code having local access to devices). Accordingly, application delivery is shifting from a download/install mechanism to a web browser distributed mechanism.

Today, mobile applications for mobile computing platforms are typically monetized via a marketplace, where users are charged a fee before downloading and installing an application. This mechanism is usually tied to the mobile platform itself, which provides the marketplace application and connects to a back-end service where payment is made and the application is distributed. With web-based applications, however, such a marketplace process is not readily available. As a consequence, the individual application providers are left to provide for themselves the key marketplace services of monetization, reputation building, advertising, and so on. Such application providers usually have to tie directly into another service to collect a fee for the use of their web-based applications, which then eliminates the key marketplace advantages of a unified, easy billing mechanism for users as well as billing alternatives such as mobile operator billing.

SUMMARY

In one particular implementation, a set of Application Programming Interfaces (APIs) are made available directly from a web browser which enable web-based application developers and providers to access them directly in order to provide services such as validating an application purchase, billing, advertising and so on. Web-based applications can call into this set of APIs to determine, for instance, if the user has paid for the use of the application. If not, the APIs direct the user to a marketplace or store, which may be either a locally-installed software component or module (e.g., an application) hosted by the computing device or a remotely-located service that enables a user to make purchases using a variety of payment authorization mechanisms. In some cases the user may have a pre-established account with the marketplace or store which may automatically be charged at the time of purchase, thereby eliminating the need for the user to enter a credit card number or the like.

In one embodiment, if the user purchases or is otherwise authorized to access the web-based application, a token or the like is saved on the client platform hosting the web browser. When the user subsequently attempts to access the web-based application, the APIs can send the token to the web-based application provider to demonstrate that payment has already been made.

One advantage of this approach is that web-based application developers and providers can leverage the marketplace model that is used by mobile application developers and providers. In this way web-based applications can be easily made available for purchase without substantial effort on the part of the developers and/or providers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
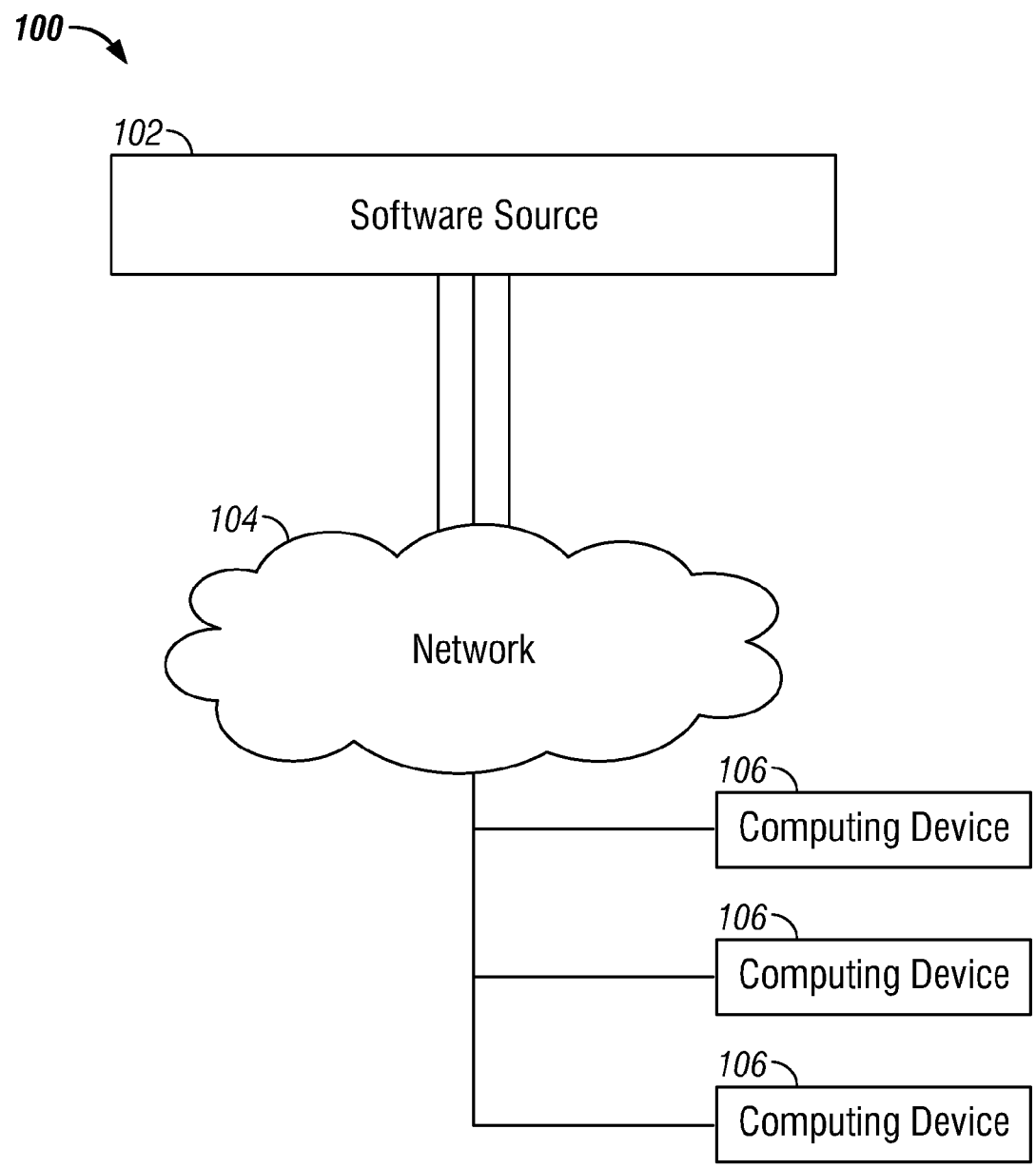
FIG. 1 is an example of an environment suitable for practicing various embodiments of the subject matter described herein.

FIG. 1 is an example of an environment suitable for practicing various embodiments of the subject matter described herein. As shown, system 100 may comprise a source 102 for the software and/or program code to be installed, a network 104, and a set of computing devices 106. These entities and components will now be further described.

Source 102 serves as the source of a web-based application. For example, source 102 can be a website, or service that is accessible to the computing devices 106. The source 102 allows users of the computing devices 106 to access web-based applications. In some embodiments, a component of source 102 is an application that runs on the computing device 106 and makes source 102 accessible via the network 104. Source 102 may include one or more servers which host the website and/or services being offered.

Network 104 provides a communication infrastructure between computing devices 106 and source 102. Network 104 may be any type of wide-area, metropolitan-area, or local area network. In addition, network 104 may comprise both wired and wireless components. In some embodiments, network 104 may be implemented on the Internet, which is the well-known global network of interconnected computers, enabling users to share information. The components and protocols employed by network 104 are well known to those skilled in the art.

Computing devices 106 may be any number of different types of computing devices, including desktop computers, laptop computers, handheld computers, personal digital assistant (PDA) devices, mobile telephone devices, smartphones, tablets, media player devices, and the like.

Figure 2:
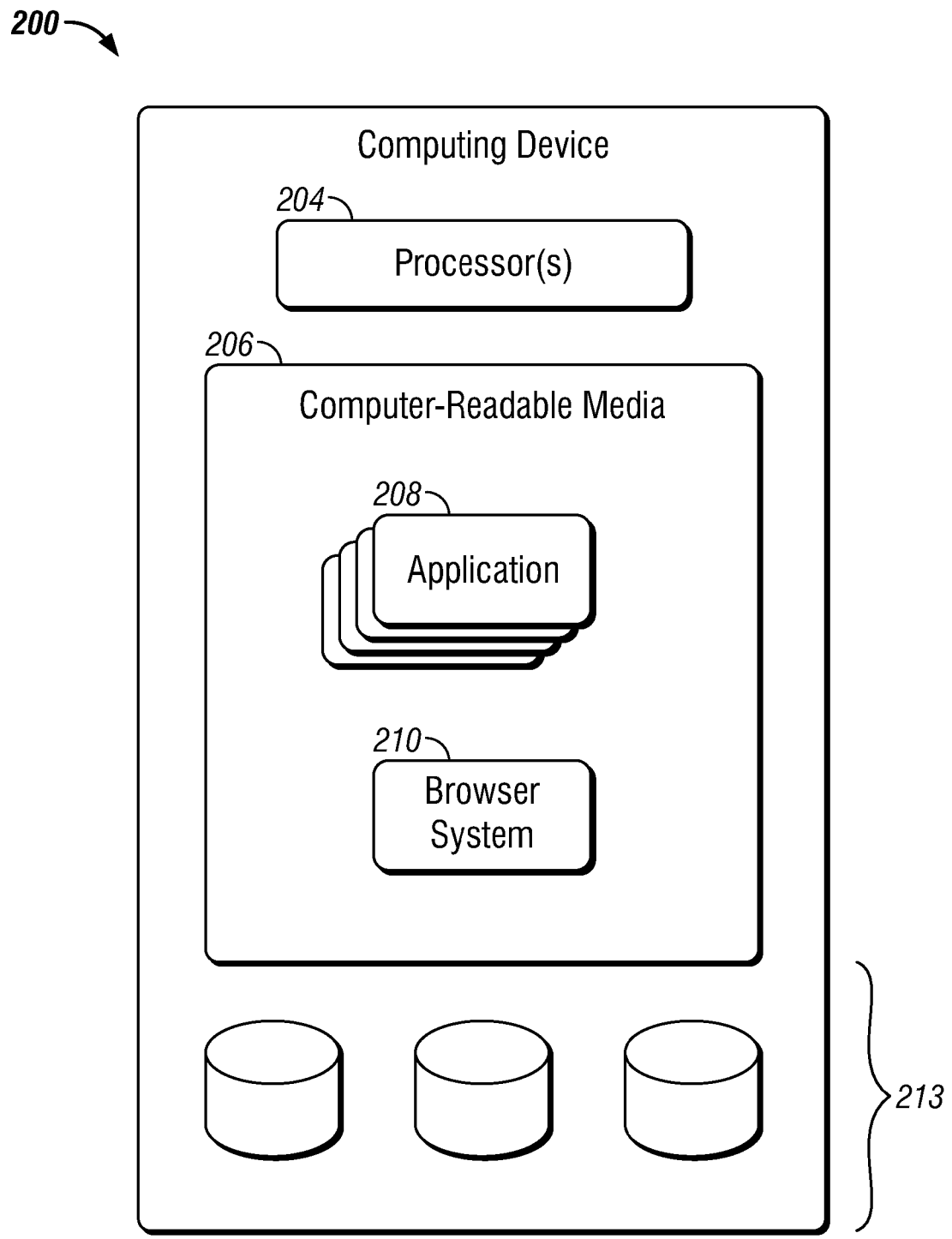
FIG. 2 shows one example of a computing device in more detail.

FIG. 2 shows one example of a computing device in more detail. The illustrative computing device 200 has one or more processors 204, one or more computer-readable media 206, one or more memory storage devices 213 and one or more applications 208 that reside on the computer-readable media and which are executable by the processor(s). The computer-readable media can include, by way of example and not limitation, all forms of volatile and non-volatile memory and/or storage media that are typically associated with a computing device, but not transmission media such as modulated data signals. Such media can include ROM, RAM, flash memory, hard disk, removable media and the like.

The web-based applications available from the source 102 in FIG. 1 may be accessed through a front end software application such as a web browser system 210 with which computing device 200 is provided. Web browser system may include any suitable web browser such as Internet Explorer® available from Microsoft, for example. Web-based applications may include hosted, or cloud-based applications, which refer to off-site or remote applications that are provided to users. Web-based applications may also include applications which are downloaded in whole or in part to the computing device or other storage medium and accessed through the web browser.

As previously mentioned, the present disclosure allows a web browser user to purchase access to web-based applications using a marketplace model in which the user may have already established an account for purpose of obtaining software applications. This functionality can be provided by incorporating into the web browser a set of application programming interfaces (APIs) which can be directly accessed by the application developer. In one implementation, for example, a user attempts to access a web-based application at a particular Universal Resource Locator (URL) (e.g., www.mywebapp.com). The web-based application determines that the user is running a web browser which provides this set of APIs. The APIs may be directly built into the web browser. The web-based application or other component calls into these APIs, which determines whether the user has previously paid for access to the web-based application. If not, the APIs direct the user to a local marketplace or store where payment can be made. Once the user pays for the application a token or other indicia of proof that payment has been made is saved on the computing device. When the user subsequently attempts to access the web-based application, the application provider can call the APIs to determine if the user has in fact been granted access. The APIs, in turn, check for the presence of the token or the like, and either sends the token to the application provider or otherwise indicates to the application provider that the user is entitled to access the web-based application.

Figure 3:
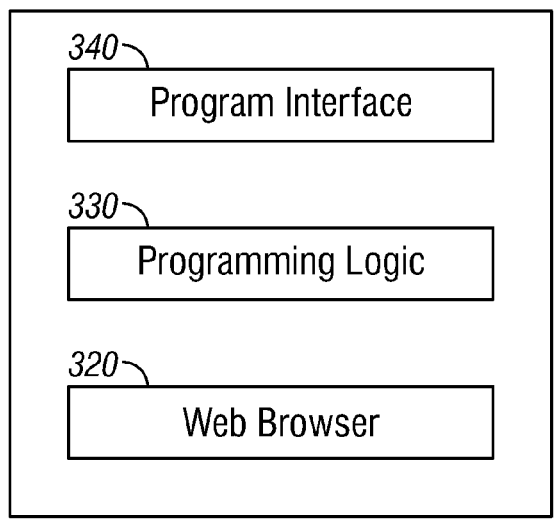
FIG. 3 shows one example of a system for purchasing or otherwise obtaining access to web-based applications using a marketplace model.

In some implementations the marketplace or store to which the user is directed may be either a locally-installed software component or module (e.g., an application) hosted by the computing device or a remotely-located service that enables a user to make purchases using a variety payment authorization mechanisms. The set of APIs may examine the system configuration (e.g., a registry key) to determine whether a locally-installed marketplace software component or a redirection to a website should be loaded for payment. In this way the computing device itself mediates payment based on how it is configured to pay web-based application developers FIG. 3 shows one example of a system 300 for purchasing or otherwise obtaining access to web-based applications using a marketplace model. The system includes a web browser 320 executing on a computing device, programming logic 330 hosted within web browser 320 and a program interface 340. Web browser 320 may comprise a software application that enables a user to display content and interact with applications that are accessible via the Internet or some other network. Web browser 320 may comprise, for example, any commercially-available or publicly-available Web browser, including but not limited to Internet Explorer®. (published by Microsoft Corporation of Redmond, Wash.), Mozilla®. Firefox®. (published by Mozilla Corporation of Mountainview, Calif.), or Safari®. (published by Apple Computer of Cupertino, Calif.). However, these examples are not intended to be limiting. More generally, web browser may be any application that is able to access and retrieve over a network one or more resources, including those resources composed in a markup language.

Program interface 340 interprets function calls from web-based applications and affiliated websites and servers such that the function calls are received in a format that is suitable for execution by the programming logic 330 and web browser 320. This ensures that programming logic 330 will operate in a consistent and reliable manner across a variety of different web browser types and also makes development easier by not requiring a developer to be concerned with web browser-specific implementation details.

Program interface 340 may include a set of APIs. In one particular implementation the set of APIs includes a Component Object Model (COM) interface. The COM interface is a platform for software componentry used to enable interprocess communication and dynamic object creation in any programming language that supports the compatible technology. The COM interface is part of Windows® API designed to access the components of Internet Explorer®. Of course, other types of programming interfaces may be used in place of the COM interface as program interface 340, especially when web browser 320 is an alternative to Internet Explorer®.

Programming logic 330 cooperates with the program interface 340 and the web browser 320 to facilitate payment for web-based applications. In particular, when the program layer receives a function call from a web-based application to which a user wishes to obtain access, programming logic 330 determines if the user is already authorized to obtain such access. For example, the programming logic 330 may search a memory storage unit for a token or the like which demonstrates that the user is authorized to access the web-based application. The token may contain access restrictions such as a validity period, etc. If the token or the like is found, the programming logic may cause the program interface to send either the token or some other proof of authorization to the website application. In some implementations the token may serve as authentication credentials as well as authorization credentials. If authentication as well as authorization is required by the website, the processes of authentication and authorization can be distinct and separate from one another or they may be combined. Of course, other authorization techniques may be used instead of, or in addition to, token-based authorization.

Figure 4:
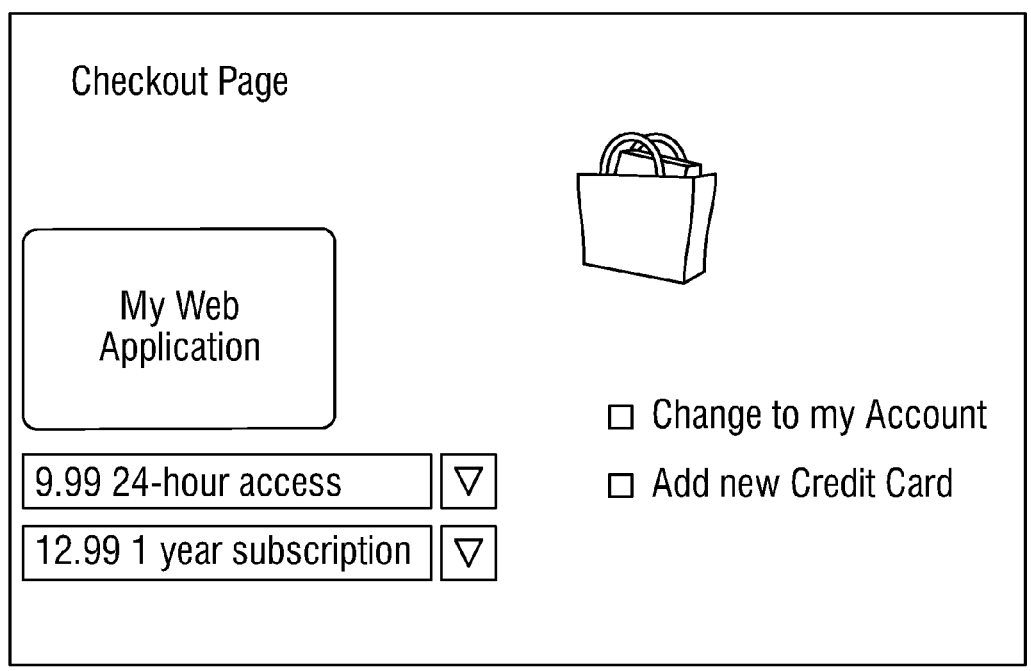
FIG. 4 shows one example of a GUI dialog window that is presented by the web browser system 300.

FIG. 4 shows one example of a GUI dialog window 400 that is presented when a user visits a website and has indicated that he or she wishes to obtain access to a web-based application. As shown, in this example the user has the option of obtaining different levels of access to the application with various time or other constraints, which in turn may affect accordingly the price to be paid by the user. In some implementations various other options may be provided to the user.

Figure 5:
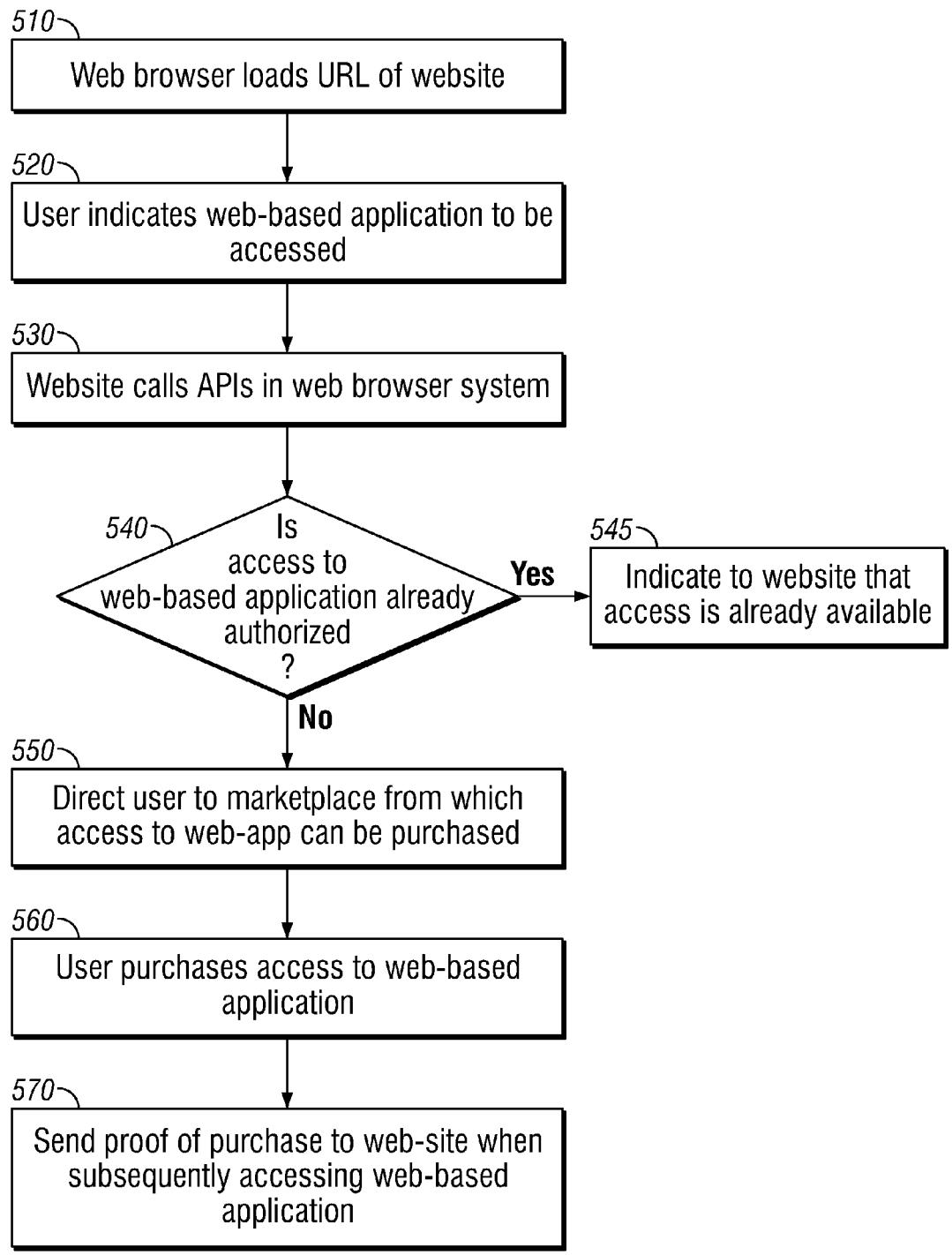
FIG. 5 is a flowchart showing one example of a method of accessing a web-based application through a web browser system.

FIG. 5 is a flowchart showing one example of a method of accessing a web-based application through a web browser system of the type described above. The method begins at block 510 when the browser loads a URL for a web-site selected by the user. For instance, a newspaper or magazine may have a pay-wall built as a chromeless, web-delivered application at the URL www.mywebapp.com. Next, at block 520 the user indicates through the web-browser that access to the web-based application is desired. In some cases the user may also select from among various level of access options that are available. In response to the user's selection, the web-based application calls the APIs in the program interface at block 530 to query if the user is already entitled to access the web-based application at the requested level. In turn, the APIs act in cooperation with the programming logic layer to query at decision block 540 if in fact user access is already available. If so, then the APIs send proof of authorization to the website at block 545 indicating that access has already been established. If, on the other hand, the user has not been authorized to receive access to the web-based application, at block 550 the system directs the user to the marketplace from which the web-based application can be obtained with proper payment. The user may then purchase access to the application at block 560 in a conventional manner. For instance, the user may charge the purchase to his or her pre-established account with the marketplace. Alternatively, a credit card or the like may be used to obtain access to the web-based application. Once purchased, proof of the authorization is sent to the web browser system at block 570 for use when the user subsequently attempts to access the application.

In some implementations the web browser system described above may operate in conjunction with, or even be integrated with, an electronic wallet application that may reside on the computing device. Electronic wallet applications are generally capable of storing a wide variety of different types of payment accounts. The user only needs to enter the information once into the payment accounts which can then be used to make purchases from a wide variety of different vendors. Such information typically includes credit card information (e.g., credit card numbers, security information such as CVN codes, expiration dates), login and password information, and possibly other personal information. Accordingly, the electronic wallet will include the information needed to purchase access to the web-based application. In this case, the web browser system may include additional APIs to access the electronic wallet at the time of purchasing access to a web-based application. These APIs may provide an integrated series of menus or interfaces allowing the user to both request and purchase access to a web-based application without having a previously established account with the marketplace.

As previously mentioned, the web browser system discussed herein may be used to access other services. For instance, in some implementations the web browser system may be used for device mediated advertising. For example, the web-based application may call the set of APIs and pass it a URI or developer ID, which the APIs use to retrieve advertisements that are displayed in the web-based application. Among other things, this approach can be used to facilitate advertisement localization. For instance, the user may be presented with advertisements targeted to the country in which the user is located or even the precise location itself.

Figure 6:
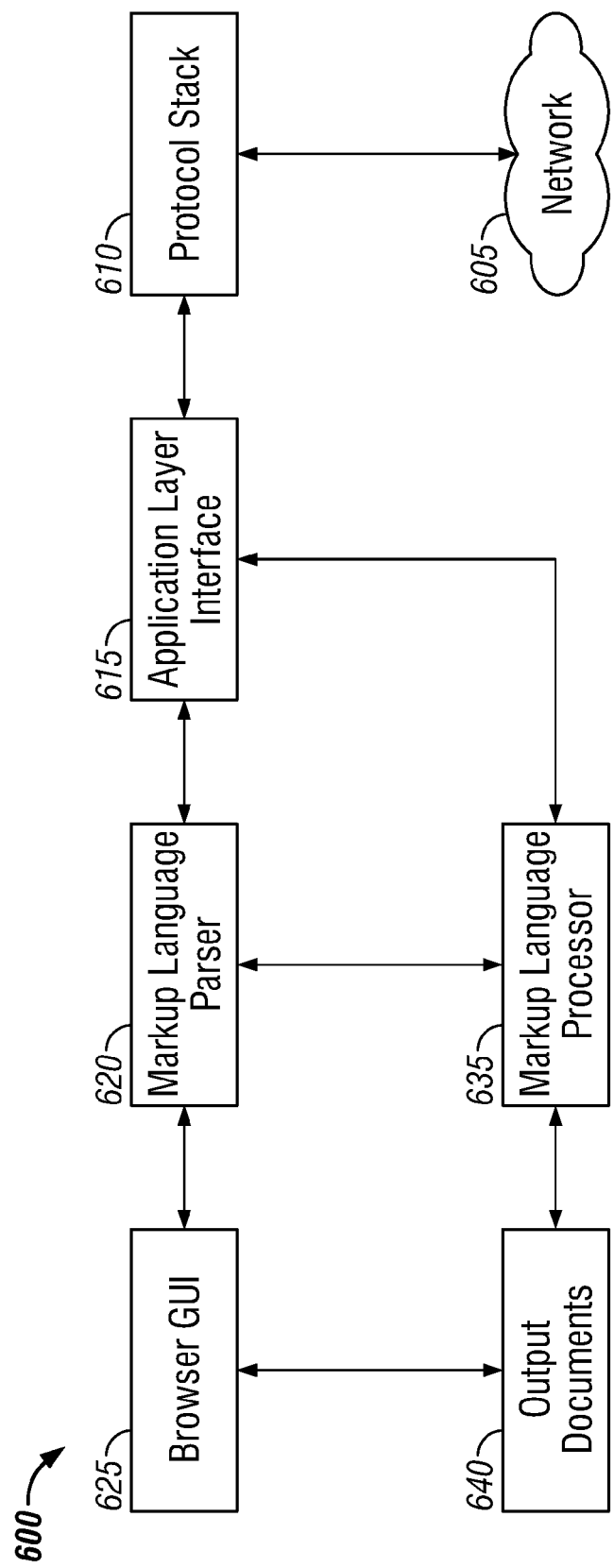
FIG. 6 shows one example of the web browser 320 shown in FIG. 3.

FIG. 6 shows one example of the web browser 320 shown in FIG. 3. The web browser 600 is coupled to a network 605 such as the network shown in FIG. 1. The web browser 600 is coupled to the network 605 using a protocol stack 610. The protocol stack 610 may be part of the browser software in specialized devices, but is typically supplied by the computer operating system. In various embodiments the protocol stack 610 is a part of an operating system or a network interface as opposed to the web browser.

The web browser 600 interfaces to the protocol stack 610 via an application layer interface 615. The application layer interface typically implements at least aspects of the hypertext transfer protocol (HTTP) or other suitable protocols. Hence the application layer interface 615 may in general implement any application layer interface. The application layer interface 615 may likewise implement session layer and presentation layer functionality in accordance with the OSI model.

The application layer interface 615 is operatively coupled to a markup language parser 620. The markup language parser 620 parses the application layer information. In current systems the application layer data typically involves HTML, XML web pages, or more generally any type of markup or document-structure language.

The markup language parser 620 is coupled to a browser GUI (graphical user interface) 625. The GUI may involve a standard web browser GUI as is currently provided by Microsoft Explorer®. Alternatively, the browser GUI may be specialized for use with portable or hand held devices. Hence the browser GUI may use audio signals in addition to or instead of graphic signals. In general, the browser GUI is a user interface that allows a user to interact with the web browser to enter network requests and to receive (view or hear) information obtained from the network. The browser GUI may involve a mouse, pointer device, a speech recognition interface, a touch-screen, a set of physical or virtual buttons, or a standard windows-based display.

A markup language processor 635 is operatively coupled to the markup language parser 620. The markup language processor is optionally operatively coupled to an output document 640. The output document 640 may be stored in the memory 720, to include disk. The output document is also coupled to the browser GUI 625. It should be noted that a given embodiment may omit certain connections and may use some connections shown as bidirectional in only one direction.

Figure 7:
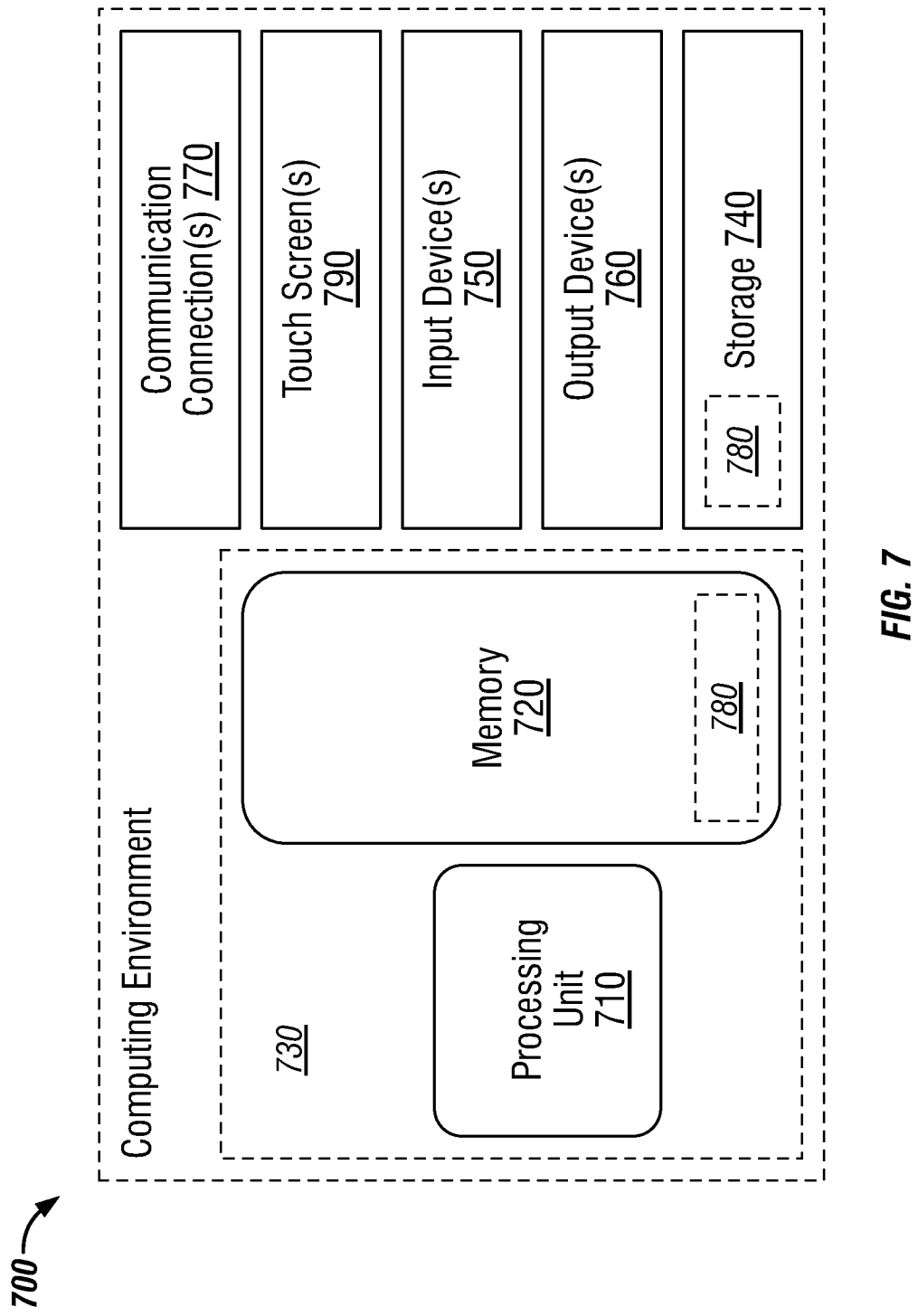
FIG. 7 illustrates a generalized example of a suitable computing environment in which described embodiments, techniques, and technologies may be implemented.

FIG. 7 illustrates a generalized example of a suitable computing environment 700 in which described embodiments, techniques, and technologies may be implemented. For example, the computing environment 700 can implement computer-executable instructions for web browser systems and other applications, as described herein.

The computing environment 700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules or instructions may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, one or more communication connections 770, and one or more touch screens 790. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, flash memory, CD-ROMs, CD-RWs, DVDs, or any other non-transitory storage medium which can be used to store information and that can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, proximity sensor, image-capture device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700. The touch screen 790 can act as an input device (e.g., by receiving touch screen input) and as an output device (e.g., by displaying a list of downloaded applications to notify a user).

In some implementations the various input devices may support natural user interface (NUI) methods. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies on which Microsoft is working include touch sensitive displays, voice and speech recognition, intention and goal understanding, motion gesture detection using depth cameras (such as stereoscopic camera systems, infrared camera systems, rgb camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

The communication connection(s) 770 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 700. By way of example, and not limitation, with the computing environment 700, computer-readable media include memory 720 and/or storage 740. As should be readily understood, the term computer-readable storage media includes non-transitory storage media for data storage such as memory 720 and storage 740, and not transmission media such as modulated data signals.

Having described and illustrated the principles of our innovations in the detailed description and accompanying drawings, it will be recognized that the various embodiments can be modified in arrangement and detail without departing from such principles. For example, any technologies described herein for capturing still photos can also be adapted for capturing video. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

The invention claimed is:

1. A system implemented on a local computing device for acquiring access to a web-based application, comprising:
   one or more computer-readable storage media;
   an application for accessing and retrieving over a network a plurality of resources, including resources composed in a markup language, said application being stored on the one or more computer-readable storage media and executing on the local computing device;
   a program interface embodied on the one or more computer-readable storage media, the program interface being configured to present a common set of application program interfaces (APIs) on the local computing device that can be used by the locally executing application to demonstrate that a user of the application is entitled to access the web-based application by making the APIs accessible to a website hosted on a remote server for querying if the user of the application is authorized to access the web-based application;
   programming logic embodied on the one or more computer-readable storage media, the programming logic being configured to determine if the user of the application is authorized to access the web-based application and if it is determined that authorization has not been established to access the web-based application, directing the application to communicate with a marketplace to obtain authorization to access the web-based application.

2. The system of claim 1 in which the marketplace is provided by a website hosted on a server, the programming logic being further configured to direct the application to the website from which the user can acquire authorization to access the web-based application.

3. The system of claim 1 in which the marketplace is a locally available software component.

4. The system of claim 2 in which the marketplace is configured to allow the user to establish accounts with the marketplace to purchase access to selected resources.

5. The system of claim 1 in which the application comprises a web browser application.

6. The system of claim 1 in which the programming logic is further configured to send to the website through the common set of APIs an indicia of proof that the authorization exists.

7. The system of claim 6 in which the indicia of proof is a token previously received from the service and stored on the one or more computer-readable storage media.

8. The system of claim 5 in which the programming logic is further configured to cause a GUI associated with the web browser to be presented which queries a user as to whether the user wishes to be directed to the marketplace from which the authorization to access the web-based application may be obtained.

9. A computer-implemented method implemented on a local computing device for accessing a web-based application, comprising:
    loading, with a web browser executing on the local computing device, a URL;
    issuing, through the web browser, a request to obtain access to the web-based application, wherein the web browser exposes a common set of application program interfaces (APIs) on the local computing device that are accessible by a website hosted on a remote server to query if the web browser is authorized to access the web-based application;
    determining, at the local computing device, if the web browser is authorized to access the web-based application;
    if it is determined that authorization has been established to access the web-based application, sending to the website through the common set of APIs an indicia of proof that the authorization exists; and
    if it is determined that authorization has not been established to access the web-based application, loading, with the web browser, a URL for a different website from which authorization to access the web-based application may be obtained.

10. The computer-implemented method of claim 9 in which the different website is a marketplace from which authorization to access a plurality of web-based applications may be obtained, a user of the web browser having a pre-established account with the marketplace to purchase access to selected web-based applications.

11. The computer-implemented method of claim 9 wherein the indicia of proof is a token received from the different website.

12. The computer-implemented method of claim 9 in which a service provided by the website is a marketplace from which authorization to access a plurality of resources may be obtained, the plurality of resources including the web-based application.

13. The computer-implemented method of claim 12 in which a service is configured to allow the user to establish accounts with the marketplace to purchase access to selected resources.

14. One or more computer-readable storage media storing computer-readable instructions that when executed by a local computing device cause the local computing device to perform a method of obtaining authorization to access a resource, the method comprising:
    receiving at a web browser executing on the local computing device a URL of a website;
    sending a request to obtain access to the resource from the website, wherein the web browser exposes a common set of application program interfaces (APIs) on the local computing device that are accessible by one or more websites supported by remote servers to query if the user is authorized to access the resource;
    if authorization has not been established to access the resource, directing the web browser to communicate with a marketplace from which authorization to access the resource may be obtained;
    receiving at the local computing device from the marketplace an indicia of proof that authorization to access the resource has been granted; and
    sending from the local computing device to the one or more websites through the common set of APIs the indicia of proof that the authorization exists.

15. The one or more computer-readable storage media of claim 14 further comprising purchasing access to the resource using an electronic wallet application.

16. The one or more computer-readable storage media of claim 15 in which a service is provided by a website that serves as a marketplace from which authorization to access a plurality of resources may be obtained.

17. The one or more computer-readable storage media of claim 14 in which the marketplace is a locally available software component.

18. The one or more computer-readable storage media of claim 14 in which the resource is a web-based application and further comprising receiving a call to the set of APIs such that the APIs, in response thereto, retrieve at least one advertisement to be displayed in the web-based application.

19. The one or more computer-readable storage media of claim 14 further comprising causing a GUI associated with the web browser to be presented which queries a user as to whether the user wishes to be directed to a website associated with the marketplace in order to obtain authorization to access the resource.

* * * * *